United States Patent
Ishihara et al.

(10) Patent No.: US 12,337,304 B2
(45) Date of Patent: Jun. 24, 2025

(54) PALLADIUM-CONTAINING COMPOSITION AND HYDROGEN PEROXIDE PRODUCTION METHOD

(71) Applicants: MITSUBISHI GAS CHEMICAL COMPANY, INC., Chiyoda-ku (JP); KYUSHU UNIVERSITY, NATIONAL UNIVERSITY CORPORATION, Fukuoka (JP)

(72) Inventors: Tatsumi Ishihara, Fukuoka (JP); Norikazu Okuda, Tokyo (JP); Ken-ichi Kimizuka, Tokyo (JP); Ken Tasaki, Ibaraki (JP)

(73) Assignees: MITSUBISHI GAS CHEMICAL COMPANY, INC., Chiyoda-ku (JP); KYUSHU UNIVERSITY, NATIONAL UNIVERSITY CORPORATION, Fukuoka (JP)

(*) Notice: Subject to any disclaimer, the term of this patent is extended or adjusted under 35 U.S.C. 154(b) by 0 days.

(21) Appl. No.: 18/318,157

(22) Filed: May 16, 2023

(65) Prior Publication Data
US 2023/0285946 A1    Sep. 14, 2023

Related U.S. Application Data

(62) Division of application No. 17/275,009, filed as application No. PCT/JP2019/035846 on Sep. 12, 2019.

(30) Foreign Application Priority Data

Sep. 13, 2018 (JP) .................................. 2018-171847

(51) Int. Cl.
*B01J 31/28* (2006.01)
*B01J 35/00* (2006.01)
(Continued)

(52) U.S. Cl.
CPC ............... *B01J 31/28* (2013.01); *B01J 35/00* (2013.01); *B01J 35/30* (2024.01); *C01B 15/029* (2013.01)

(58) Field of Classification Search
None
See application file for complete search history.

(56) References Cited

U.S. PATENT DOCUMENTS 4,128,627 A  12/1978  Dyer et al.
5,482,596 A   1/1996  Wu
(Continued)

FOREIGN PATENT DOCUMENTS

CN  103002984 A  *  3/2013  ............. B01J 23/40
EP   1 957 196 A1    8/2008
(Continued)

OTHER PUBLICATIONS

CN 103002984 A, Machine-generated English translation (Year: 2013).*

(Continued)

*Primary Examiner* — Yun Qian
(74) *Attorney, Agent, or Firm* — Oblon, McClelland, Maier & Neustadt, L.L.P.

(57) ABSTRACT

It is desired to develop a method of producing hydrogen peroxide, which is capable of producing hydrogen peroxide with high production efficiency. According to the present invention, provided is a palladium-containing composition comprising palladium particles and a coating agent that coats the surface of the palladium particles, wherein a compound having an O=X structure (wherein X represents any of a phosphorus atom, a sulfur atom, and a carbon atom) is comprised as the coating agent.

13 Claims, 1 Drawing Sheet

(a)

(b)

(51) Int. Cl.
   *B01J 35/30*     (2024.01)
   *C01B 15/029*    (2006.01)

(56) References Cited

U.S. PATENT DOCUMENTS

| | | |
|---|---|---|
| 5,902,898 A | 5/1999 | Wu |
| 2003/0100443 A1 | 5/2003 | Bender et al. |
| 2004/0184983 A1 | 9/2004 | Paparatto et al. |
| 2007/0086940 A1 | 4/2007 | Le-Khac et al. |
| 2009/0075815 A1 | 3/2009 | Kaneda et al. |
| 2013/0022535 A1 | 1/2013 | Chung et al. |

FOREIGN PATENT DOCUMENTS

| | | |
|---|---|---|
| EP | 2 554 253 A2 | 2/2013 |
| JP | 11-505833 A | 5/1999 |
| JP | 2003-226905 A | 8/2003 |
| JP | 2005-272255 A | 10/2005 |
| JP | 2007-84372 A | 4/2007 |
| JP | 2007-239054 A | 9/2007 |
| JP | 2007-530248 A | 11/2007 |
| JP | 2009-511414 A | 3/2009 |
| JP | 2009-203162 A | 9/2009 |
| JP | 2015-27678 A | 2/2015 |
| KR | 10-2004-0019077 | 3/2004 |
| WO | WO 03/040270 A2 | 5/2003 |
| WO | WO 2016/077445 A1 | 5/2016 |
| WO | WO 2018/016359 A1 | 1/2018 |

OTHER PUBLICATIONS

Okada et al. The Journal of Physical Chemistry C, 2012, 116, 14360-14367 (Year: 2012).*
Metallurgical Industry Press, Oct. 31, 2012, pp. 130-131 (with cover pages).
Combined Chinese Office Action and Search Report issued Jul. 21, 2023 I Chinese Application No. 201980058569.4, (with English translation of Category of Cited Documents), 9 pages.
Office Action dated Jun. 26, 2023, in co-pending U.S. Appl. No. 17/275,009.
Korean Office Action issued Jul. 8, 2024, in corresponding Korean Patent Application No. 10-2021-7002170 with English Machine Translation.
International Search Report issued on Oct. 8, 2019 in PCT/JP2019/035846 filed on Sep. 12, 2019, 2 pages.
Office Action issued on Dec. 8, 2022, in corresponding Chinese Patent Application No. 201980058569.4.
Notice of Reasons for Refusal issued Apr. 25, 2023 in Japanese Patent Application No. 2020-546068 (with English language translation), 11 pages.

* cited by examiner

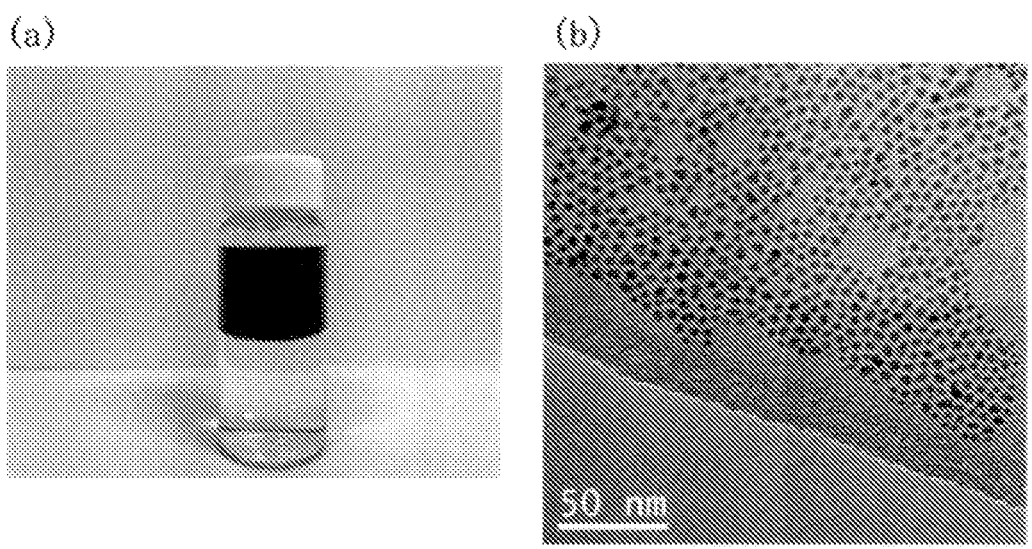

PALLADIUM-CONTAINING COMPOSITION AND HYDROGEN PEROXIDE PRODUCTION METHOD

CROSS-REFERENCE TO RELATED APPLICATIONS

The present application is a divisional application of U.S. application Ser. No. 17/275,009, filed Mar. 10, 2021. U.S. application Ser. No. 17/275,009 is a 35 U.S.C. § 371 national stage application of International patent application PCT/JP2019/035846, filed Sep. 12, 2019, which is based on and claims the benefit of priority to Japanese Application No. 2018-171847, filed on Sep. 13, 2018. The entire contents of all of the above applications are incorporated herein by reference.

TECHNICAL FIELD

The present invention relates to a palladium-containing composition, and a method of producing hydrogen peroxide, in which the palladium-containing composition is used, and hydrogen and oxygen are allowed to directly react with each other to obtain hydrogen peroxide.

BACKGROUND ART

Since hydrogen peroxide has oxidizing power and strong bleaching and/or bactericidal action, it is used as a bleaching agent and/or a bactericide for papers, pulps, fibers, and the like. In addition, hydrogen peroxide is an important industrial product used in a wide range of oxidation reactions including epoxidation and hydroxylation as typical examples.

Furthermore, hydrogen peroxide is used for the cleaning of the surface of semiconductor substrates, etc. in the semiconductor industry, the chemical polishing of the surface of copper, tin and other copper alloys, the etching of electronic circuits, and the like. Since the degradation products of hydrogen peroxide are water and oxygen, hydrogen peroxide holds a prominent position also from the viewpoint of green chemistry, and thus, hydrogen peroxide has attracted attention, particularly, as a material alternative for chlorine-bleaching agents.

As methods of producing hydrogen peroxide, an anthraquinone process, an electrolytic process, a method involving oxidation of isopropyl alcohol, etc. have been known. Conventionally, the anthraquinone process has been mainly adopted in the industrial field. However, since the anthraquinone process is a multi-stage method comprising multiple stages such as hydrogenation of anthraquinone, air oxidation, extraction of the generated hydrogen peroxide with water, and further, purification, and concentration, this process is problematic in terms of high capital investment, the use of a large amount of energy, the release of an organic solvent used for dissolving anthraquinone into the air, etc.

As a method of solving the above-described problems, Patent Literature 1 proposes that a precious metal colloidal solution, in which colloidal particles containing a precious metal are dispersed, are allowed to coexist and react in a reaction system in a method of directly synthesizing hydrogen peroxide in which hydrogen is allowed to react with oxygen (which is also referred to as a "direct production method"). Patent Literature 1 describes that hydrogen peroxide can be produced with high production efficiency according to the aforementioned method. However, there has been plenty of room for improvement in terms of production efficiency.

CITATION LIST

Patent Literature

Patent Literature 1: JP Patent Publication (Kokai) No. 2005-272255 A

SUMMARY OF INVENTION

Technical Problem

In view of the foregoing, it has been desired to develop a method of producing hydrogen peroxide, which is capable of producing hydrogen peroxide with high production efficiency.

Moreover, it has also been desired to develop a palladium-containing composition, which can be used in the above-described production method.

Solution to Problem

Specifically, the present invention is as follows.
<1>
A palladium-containing composition comprising palladium particles and a coating agent that coats the surface of the palladium particles, wherein
a compound having an O=X structure (wherein X represents any of a phosphorus atom, a sulfur atom, and a carbon atom) is comprised as the coating agent.
<2>
The palladium-containing composition according to the above <1>, wherein the compound further has an aryl group or an alkyl group containing 1 to 10 carbon atoms.
<3>
The palladium-containing composition according to the above <1> or <2>, wherein, in the compound, X represents a phosphorus atom or a sulfur atom.
<4>
The palladium-containing composition according to any one of the above <1> to <3>, wherein the compound is triphenylphosphine oxide, diphenyl sulfoxide, or diphenyl sulfone.
<5>
The palladium-containing composition according to any one of the above <1> to <4>, wherein the palladium particles are palladium colloidal particles.
<6>
The palladium-containing composition according to the above <5>, wherein the particle diameter of the palladium colloidal particles is 1 to 10 nm.
<7>
The palladium-containing composition according to any one of the above <1> to <6>, which further comprises platinum particles.
<8>
The palladium-containing composition according to the above <7>, wherein the platinum particles are platinum colloidal particles, and the platinum colloidal particles is coated with the coating agent.
<9>
The palladium-containing composition according to any one of the above <1> to <8>, which is used as a catalyst in the production of hydrogen peroxide by reacting hydrogen with oxygen.

<10>
A palladium-containing solution comprising the palladium-containing composition according to any one of the above <1> to <9> and an organic solvent.
<11>
The palladium-containing solution according to the above <10>, wherein the concentration of palladium is 5 mmol/L or more.
<12>
A method of producing hydrogen peroxide, comprising reacting hydrogen with oxygen to obtain hydrogen peroxide, wherein
the palladium-containing composition according to any one of the above <1> to <9> is used as a catalyst.
<13>
The production method according to the above <12>, which comprises:
mixing the palladium-containing composition with an organic solvent to prepare a palladium-containing solution,
mixing the palladium-containing solution with water or an aqueous solution to prepare a mixed solution, and
supplying hydrogen and oxygen into the mixed solution to generate hydrogen peroxide.
<14>
The production method according to the above <13>, wherein
the organic solvent is a benzene derivative, and
upon preparation of the mixed solution, the palladium-containing solution is mixed with a sodium bromide aqueous solution.
<15>
The production method according to the above <14>, wherein the organic solvent is toluene.
<16>
The production method according to any one of the above <13> to <15>, wherein, in the reaction solution after generation of hydrogen peroxide, the palladium particles are present in an organic layer and the hydrogen peroxide is present in a water layer.
<17>
The production method according to any one of the above <12> to <16>, wherein only the palladium-containing composition is used as a catalyst.
<18>
The production method according to any one of the above <13> to <17>, wherein the water or aqueous solution is an acid aqueous solution having a pH value of 0.5 to 2.0.

Advantageous Effects of Invention

In the palladium-containing composition of the present invention, palladium particles can be converted to be hydrophobic due to the O=X structure of a coating agent. Thus, if the palladium-containing composition of the present invention is used as a catalyst, for example, in a direct production method of hydrogen peroxide, a mixed solvent of an organic solvent and water or an aqueous solution can be used as a reaction solvent, and as a result, hydrogen peroxide can be produced with high efficiency.

BRIEF DESCRIPTION OF DRAWINGS

FIG. 1 includes photographs showing that an example of a palladium-containing solution is mixed with water or an aqueous solution to obtain a mixed solution, which is then left at rest. FIG. 1(a) shows a mixed solution as a whole. FIG. 1(b) is a TEM photograph showing an organic layer.

DESCRIPTION OF EMBODIMENTS

In one aspect of the present invention, hydrogen peroxide is produced according to a direct production method of reacting hydrogen with oxygen. In the direct production method, a palladium catalyst is used.

In the present invention, as a palladium catalyst, a palladium-containing composition comprising palladium particles and a coating agent that coats the surface of the palladium particles (hereinafter also referred to as "the palladium-containing composition of the present invention") is used.

<Palladium-Containing Composition>

The palladium-containing composition of the present invention is obtained by mixing a known palladium particle catalyst with a coating agent.

Examples of known palladium particles may include particles of palladium itself; palladium salts, such as palladium acetate, palladium chloride, palladium nitrate, and palladium(II) acetylacetonate; and palladium complex salts, such as ammonium tetrachloropalladate(II) and tetraamminepalladium(II) chloride monohydrate.

The palladium particles are preferably palladium colloidal particles. The specific mean particle diameter is not particularly limited, and in general, it is preferably 1 to 10 nm, more preferably 1 to 7 nm, particularly preferably 1 to 6 nm, and most preferably 3 to 6 nm. The mean particle diameter can be obtained by measuring any given 100 particles shown in a TEM photograph in terms of diameter, and then calculating a mean value of the diameters.

The coating agent plays a role for chemically modifying the surface of the palladium particles, and it is also referred to as a protecting agent. In the present invention, it is important to use an agent comprising a compound having an O=X structure (wherein X represents any of a phosphorus atom, a sulfur atom, and a carbon atom) as a coating agent (hereinafter, also abbreviated as a "coating agent having an O=X structure").

Conventionally, according to the direct production method, hydrogen is allowed to react with oxygen in water, in which a palladium catalyst is present, so as to generate hydrogen peroxide. According to this method, however, even though various efforts had been made to increase the speed of generating hydrogen peroxide, good results had not been obtained. As a result of intensive studies conducted by the present inventors, it was found that one of the causes would be a problem regarding decomposition of hydrogen peroxide that the generated hydrogen peroxide ($H_2O_2$) is contacted with a palladium catalyst, so that it becomes radicals (·OH) and the radicals are then reacted with hydrogen, and thereby they become water. In order to avoid the contact of the palladium catalyst with the hydrogen peroxide to the maximum, it is effective that a mixed solution of water and an organic solvent is used as a solvent, the palladium catalyst is unevenly distributed in an organic layer, and the hydrogen peroxide is unevenly distributed in water. For this reason, in the present invention, palladium particles are coated with a coating agent having an O=X structure, so that the palladium particles are converted to be hydrophobic (non-aqueous system).

Specific examples of the compound having an O=X structure may include triphenylphosphine oxide, trioctylphosphine oxide, methyl(diphenyl)phosphine oxide, trans,trans-1,5-diphenyl-1,4-pentadien-3-one, diphenyl sulfoxide, and diphenyl sulfone.

From the viewpoint of easy availability, it is preferable that the compound having an O=X structure further has an aryl group or an alkyl group containing 1 to 10 carbon atoms.

X in the O=X structure is preferably a phosphorus atom or a sulfur atom because it causes a particularly high speed of generating hydrogen peroxide. Specifically, the compound having an O=X structure is preferably triphenylphosphine oxide, diphenyl sulfoxide, or diphenyl sulfone, and is more preferably diphenyl sulfoxide or diphenyl sulfone. The reason why the speed of generating hydrogen peroxide becomes particularly high when these compounds are used as coating agents is unknown. The present inventors have assumed that polarizability bias would influence on an increase in the speed of generating hydrogen peroxide. That is to say, the inventors have considered that a compound having a high electron density and a high polarizability in the O=X structure tends to cause a high speed of generating hydrogen peroxide.

The amount of the coating agent having an O=X structure is determined, as appropriate, depending on the molecular weight of the coating agent having an O=X structure, etc. The coating agent is used in an amount of preferably 50% to 10,000% by mass, more preferably 100% to 7,500% by mass, further preferably 100% to 4,000% by mass, particularly preferably 100% to 2,000% by mass, and most preferably 100% to 1,000% by mass, with respect to the mass of the palladium particles. If the amount of the coating agent used is too small, it is likely that the effect of imparting affinity for the organic solvent is decreased. On the other hand, if the amount of the coating agent used is too large, it does not provide significant advantages, and also, it provides a disadvantage that is an increase in the production costs.

Moreover, from the viewpoint of further activating generation of hydrogen peroxide, it is preferable to mix platinum particles into the palladium-containing composition of the present invention. Examples of the platinum particles may include particles comprising: platinum complexes having platinum as a central metal and also having, as a ligand, porphyrin, phenylpyridine, bipyridine, terpyridine, salen, phenylpyridine, acetylacetonate, etc.; chloroplatinic acid; and cis-diaminedichloro-platinum(II). The platinum particles are preferably bis(acetylacetonato)platinum (II) particles.

The platinum particles are particularly preferably platinum colloidal particles. The specific mean particle diameter is not particularly limited, and in general, it is preferably 1 to 10 nm, more preferably 1 to 7 nm, particularly preferably 1 to 6 nm, and most preferably 3 to 6 nm. The surface of the platinum colloidal particles is also preferably coated with the aforementioned coating agent.

Furthermore, a reducing agent for reducing Pd(II) to Pd(0) is preferably mixed into the palladium-containing composition of the present invention. Examples of the reducing agent may include oleic acid, hydrazine, $NaBH_4$, and alcohol. Among these, oleic acid is preferable as such a reducing agent.

The amount of the reducing agent used is determined, as appropriate. In general, the reducing agent is preferably used in an amount of 5% to 10,000% by mass with respect to the mass of the palladium particles.

The palladium-containing composition of the present invention is produced by mixing palladium particles with a coating agent and then stirring the mixture in the presence of an organic solvent at a temperature of generally 20° C. to 100° C., preferably 30° C. to 80° C., and particularly preferably 40° C. to 60° C. When platinum particles are used, the palladium particles and the platinum particles are mixed with the coating agent, and the mixture is then stirred.

As an organic solvent used herein, a known organic solvent may be selected, as appropriate, and may be used. For example, chloroform, acetone, acetonitrile, carbonic acid ester, etc. may be used.

The organic solvent may be used in an amount sufficient for dissolving Pd salts therein. The organic solvent is used in an amount of preferably 500% to 30,000% by mass, more preferably 1,000% to 20,000% by mass, and particularly preferably 1,000% to 3,000% by mass, with respect to the mass of the palladium particles.

When platinum particles are used, palladium particles: platinum particles (molar ratio) is preferably 99:1 to 50:50, more preferably 99:1 to 90:10, and particularly preferably 99:1 to 95:5.

<Production of Hydrogen Peroxide>

The thus obtained palladium-containing composition, preferably, only the palladium-containing composition is used as a catalyst, and hydrogen is allowed to react with oxygen according to an ordinary method, so that hydrogen peroxide can be produced.

Preferably, a palladium-containing composition is mixed with an organic solvent to prepare a palladium-containing solution, and the obtained palladium-containing solution is then mixed with water or an aqueous solution to prepare a mixed solution. Thereafter, hydrogen and oxygen are supplied into the mixed solution, so that hydrogen peroxide may be generated in the solution.

As previously described above, if a reaction solvent prepared by mixing an organic solvent with water or an aqueous solution is used, upon a reaction of generating hydrogen peroxide, palladium particles are present in an organic layer, whereas the generated hydrogen peroxide is dissolved in a water layer. Thus, the contact of palladium particles with hydrogen peroxide can be avoided to the maximum by separating the palladium particles from the hydrogen peroxide during the reaction, and decomposition of the hydrogen peroxide can be suppressed. In fact, in the after-mentioned Examples, as a result of suppression of decomposition of hydrogen peroxide, it is demonstrated that the speed of generating hydrogen peroxide that indicates the molar amount of hydrogen peroxide generated per unit time is significantly high. In addition, the "selectivity" that indicates the ratio of the amount of hydrogen used in generation of hydrogen peroxide to the amount of hydrogen consumed is also improved. After termination of the generation reaction, a high concentration of hydrogen peroxide is dissolved in the water layer.

Moreover, when the palladium-containing composition comprises platinum particles, hydrogen peroxide tends to be more activated. The reason is not clear, but it is assumed that activation of hydrogen is further promoted due to the presence of platinum particles.

The organic solvent used to prepare a palladium-containing solution can be either a non-polar solvent or a polar solvent. Examples of the non-polar solvent may include: aromatic hydrocarbons, specifically, benzene; benzene derivatives comprising an alkyl substituent containing 1 to 5 carbon atoms; quinone derivatives; hydroquinone derivatives; and methylnaphthalene. Examples of the benzene derivative may include toluene, butylbenzene, pseudocumene (1,2,4-trimethylbenzene), 1,3,4-trimethylbenzene, 1,2,5-trimethylbenzene, mesitylene (1,3,5-trimethylbenzene), tert-butylbenzene, and tert-butyltoluene. Examples of the polar solvent may include higher alcohols such as diisobutylcarbinol, carboxylic acid ester, tetra-substituted urea, cyclic urea, and trioctyl phosphoric acid. For preparation of the palladium-containing solution, the organic solvent may be used alone as a single type, or may also be used in combination of two or more types. The organic solvent is preferably a benzene derivative, and is particularly preferably toluene, from the viewpoint that it is an organic solvent that has previously been used in the anthraquinone process.

The amount of the organic solvent used in preparation of the palladium-containing solution may be determined, so that the ratio between the organic layer and the water layer can be within the after-mentioned range in the mixed solution.

From the viewpoint of the palladium-containing solution that effectively functions as a catalyst, the concentration of palladium in the palladium-containing solution is preferably 5 mmol/L or more, more preferably 10 mmol/L or more, and particularly preferably 30 mmol/L or more. The upper limit of the palladium concentration is not particularly limited, and it is preferably 100 mmol/L or less, more preferably 80 mmol/L or less, and particularly preferably 50 mmol/L or less.

When the palladium-containing composition comprises platinum particles, the concentration of platinum in the palladium-containing solution is preferably 0.2 mmol/L or more, more preferably 0.4 mmol/L or more, further preferably 1.1 mmol/L or more, and particularly preferably 1.2 mmol/L or more. The upper limit of the platinum concentration is not particularly limited, and it is preferably 4.0 mmol/L or less, more preferably 3.5 mmol/L or less, and particularly preferably 2.0 mmol/L or less.

The water or the aqueous solution used herein is preferably an aqueous solution containing sodium bromide (NaBr). The concentration of sodium bromide is preferably higher than 0 mmol/L and 100 mmol/L or less, and particularly preferably 5 to 50 mmol/L.

When the water or the aqueous solution is a sodium bromide-containing aqueous solution, it is preferable that the organic solvent be a benzene derivative, and that upon preparation of a mixed solution, the palladium-containing solution be mixed with the sodium bromide aqueous solution.

Phosphoric acid ($H_3PO_4$) may be further dissolved in the aqueous solution. In such a case, the concentration of phosphoric acid is preferably higher than 0 mmol/L and 10 mmol/L or less. When phosphoric acid is dissolved in the aqueous solution, the aqueous solution is biased to the acidic side.

The acid aqueous solution is preferable because it tends to suppress the decomposition rate of hydrogen peroxide and to accelerate generation of hydrogen peroxide. The pH (25° C.) of the acid aqueous solution is less than 7, and is preferably less than 3.5. From the viewpoint of higher accumulation of hydrogen peroxide, the pH of the acid aqueous solution is particularly preferably 0.5 to 2.0. When the pH of the acid aqueous solution is set to be pH 3 or less, and in particular, pH 1 or less, strong acid such as sulfuric acid or hydrochloric acid is preferably used in addition to the aforementioned phosphoric acid, and in particular, sulfuric acid is preferably used. For example, in the case of using sulfuric acid, the concentration of the sulfuric acid is preferably 0.01 to 10 mol/L.

Photographs regarding an example of the mixed solution before addition of hydrogen and oxygen are shown in FIG. 1. As understood from FIG. 1(a), the mixed solution is a two-phase system of a water phase consisting of water or an aqueous solution and an organic phase consisting of a palladium-containing solution. FIG. 1(b) is a TEM photograph of the organic layer shown in FIG. 1(a). In the organic layer of FIG. 1(b), palladium particles are agglutinated to form colloidal particles, and the circumference of the colloidal particles is coated with a coating agent. The palladium colloidal particles coated with the coating agent are uniformly dispersed in the organic solvent.

With regard to the ratio (volume ratio) between the organic layer (a palladium-containing solution) and the water layer (a water or an aqueous solution) in the mixed solution, the organic layer:the water layer is preferably 15:1 to 0.04:1, and is more preferably 3.5:1 to 0.35:1. If the volume of the water layer is too large, the concentration of hydrogen peroxide in the water layer is likely to become low after termination of the reaction.

After completion of the reaction of generating hydrogen peroxide by supplying hydrogen and oxygen, the organic layer is separated from the water layer, and thereafter, a hydrogen peroxide aqueous solution is obtained from the water layer according to an ordinary method.

In the present description, a method of producing hydrogen peroxide by using a mixed solution of water and organic solvent is mainly explained. However, even if the palladium-containing composition of the present invention is used as a catalyst in the conventional direct production method of using an aqueous solvent, the efficiency of producing hydrogen peroxide that is excellent to a certain extent can be realized.

Moreover, in the present description, the case of using the palladium-containing composition of the present invention as a catalyst for producing hydrogen peroxide is mainly explained. However, the palladium-containing composition of the present invention can be preferably used even for other intended uses, as long as the present palladium-containing composition that is characterized in that it comprises hydrophobic (non-aqueous system) palladium particles can be utilized. For example, the present palladium-containing composition can be used as a catalyst in other chemical reactions.

EXAMPLES

Hereinafter, the present invention will be more specifically described in the following examples. However, the present invention is not limited to these examples.

<Measurement of the Concentration of Hydrogen Peroxide in Water Layer>

The water layers obtained in individual Examples and Comparative Examples were analyzed using a hydrogen peroxide automatic titrator (manufactured by Hiranuma Sangyo, Co., Ltd., Sterilization Cleaning Liquid Concentration Counter Series, Hydrogen Peroxide Counter HP-300) based on an iodine coulometric titration method, and the concentration (number of moles) of hydrogen peroxide in the water layer was obtained.

<Measurement of the Amount of Hydrogen Contained in Discharged Gas from the Reaction System>

Discharged gas from the reaction system was analyzed by gas chromatography (GC-TCD), and the amount of hydrogen (number of moles) contained in the discharged gas was obtained.

Measurement apparatus: Shimadzu Corporation GC-8A
Measurement conditions: carrier gas: Ar; column: Molecular Sieve 5A 2 m; temperature: room temperature <Calculation of the Speed of Generating Hydrogen Peroxide>

The value (number of moles) of the concentration of hydrogen peroxide in the water layer obtained in each of the examples and the comparative examples and the reaction time (h) in each of the examples and the comparative examples were introduced into the following equation to calculate the speed of generating hydrogen peroxide (mmol/h):

The speed of generating hydrogen peroxide (mmol/h)=the concentration [mmol] of hydrogen peroxide generated in the water layer/the reaction time [h].

<Calculation of Hydrogen Conversion Rate>

In each of the examples and the comparative examples, the value of the amount (number of moles) of hydrogen gas contained in discharged gas and the value of the amount (number of moles) of hydrogen gas supplied were introduced into the following equation to calculate the percentage (%) of hydrogen consumed in the reaction of producing hydrogen peroxide. Specifically, the hydrogen conversion rate indicates the percentage of hydrogen consumed in the reaction of producing hydrogen peroxide:

Hydrogen conversion rate (%)=(1−the amount (number of moles) of hydrogen gas in discharged gas/the amount (number of moles) of hydrogen gas supplied)×100.

<Calculation of Selectivity>

The speed of consuming hydrogen gas [mmol/h] was calculated according to the following equation:

The speed [mmol/h] of consuming hydrogen gas= (the amount [mmol] of hydrogen gas supplied−the amount [mmol] of hydrogen gas in discharged gas)/reaction time [h].

Selectivity (%) in each of the examples and the comparative examples was obtained according to the following equation:

Selectivity [%]=(the speed [mmol/h] of generating hydrogen peroxide)/(the speed [mmol/h] of consuming hydrogen gas)×100.

Specifically, selectivity indicates the percentage of hydrogen used in the synthesis of hydrogen peroxide, in the hydrogen consumed in the reaction producing the hydrogen peroxide.

Example 1

To a two-necked eggplant shaped flask, 112 mg of palladium acetate (0.5 mmol; molecular weight of palladium acetate: 224.51) and 2.78 g of triphenylphosphine oxide (10 mmol; molecular weight of triphenylphosphine oxide: 278.29) were added. Further, 4.0 mL of chloroform was added thereto, and the obtained mixture was then stirred at 50° C. for dissolution. Subsequently, 3.2 mL of oleic acid was added to the reaction mixture, and the obtained mixture was then stirred at 50° C. for 1 hour while heating to obtain a black solution. Thereafter, heating was terminated, and the obtained solution was then cooled to room temperature. Hence, a palladium-containing composition was obtained. To the obtained palladium-containing composition, toluene was added to result in a total amount of 45 mL, thereby obtaining a palladium-containing solution A comprising triphenylphosphine oxide/palladium nanocolloidal particles. The content of palladium in the palladium-containing solution A, which was calculated from the amount of the palladium acetate added and the amount of the solution (i.e., the aforementioned "total amount"), was 11.1 mmol/L. The palladium-containing solution was observed using TEM, and the size of the palladium nanocolloid was measured. As a result, the average size was measured to be 5.9 nm.

Example 2

A palladium-containing solution B comprising trioctylphosphine oxide/palladium nanocolloidal particles was obtained in the same manner as that of Example 1, with the exception that 3.87 g (10 mmol) of trioctylphosphine oxide was used instead of 2.78 g of triphenylphosphine oxide. The content of palladium in the palladium-containing solution B, which was calculated from the amount of the palladium acetate added and the amount of the solution, was 11.1 mmol/L.

Example 3

A palladium-containing solution C comprising methyl (diphenyl)phosphine oxide/palladium nanocolloidal particles was obtained in the same manner as that of Example 1, with the exception that 2.16 g (10 mmol) of methyl (diphenyl)phosphine oxide was used instead of 2.78 g of triphenylphosphine oxide. The content of palladium in the palladium-containing solution C, which was calculated from the amount of the palladium acetate added and the amount of the solution, was 11.1 mmol/L.

Example 4

A palladium-containing solution D comprising trans, trans-1,5-diphenyl-1,4-pentadien-3-one/palladium nanocolloidal particles was obtained in the same manner as that of Example 1, with the exception that 2.34 g (10 mmol) of trans,trans-1,5-diphenyl-1,4-pentadien-3-one was used instead of 2.78 g of triphenylphosphine oxide. The content of palladium in the palladium-containing solution D, which was calculated from the amount of the palladium acetate added and the amount of the solution, was 11.1 mmol/L.

Example 5

To a two-necked eggplant shaped flask, 112 mg (0.50 mmol) of palladium acetate and 2.78 g (10 mmol) of triphenylphosphine oxide were added. Further, 4.0 mL of chloroform was added thereto, and the obtained mixture was then stirred at 50° C. for dissolution. Subsequently, 3.2 mL of oleic acid was added to the reaction mixture, and the obtained mixture was then stirred at 50° C. for 1 hour while heating to obtain a black solution. Thereafter, heating was terminated, and the obtained solution was then cooled to room temperature. Hence, a palladium-containing composition was obtained. To the obtained palladium-containing composition, toluene was added to result in a total amount of 50.0 mL, thereby obtaining a palladium-containing solution E comprising triphenylphosphine oxide/palladium nanocolloidal particles. The content of palladium in the palladium-containing solution E, which was calculated from the amount of the palladium acetate added and the amount of the solution, was 10.0 mmol/L.

Example 6

A palladium-containing solution G comprising diphenyl sulfoxide/palladium nanocolloidal particles was obtained in the same manner as that of Example 5, with the exception that 2.02 g (10 mmol) of diphenyl sulfoxide was used instead of 2.78 g of triphenylphosphine oxide. The content of palladium in the palladium-containing solution G, which was calculated from the amount of the palladium acetate added and the amount of the solution, was 10.0 mmol/L.

Comparative Example 1

A palladium-containing solution I comprising oleylamine/palladium nanocolloidal particles was obtained in the same manner as that of Example 1, with the exception that 2.67 g (10 mmol) of oleylamine was used instead of 2.78 g of triphenylphosphine oxide. The content of palladium in the palladium-containing solution I, which was calculated from the amount of the palladium acetate added and the amount of the solution, was 11.1 mmol/L.

Example 7

40 mL of the palladium-containing solution A obtained in Example 1 and 90 mL of an aqueous solution, in which 0.5 mmol/L $H_3PO_4$ (phosphoric acid), and 2 mmol/L NaBr (sodium bromide) had been dissolved, was loaded into an autoclave equipped with a stirrer and a gas blowing pipe, so as to obtain a mixed solution. At this time, the ratio between the water layer and the organic layer (the aqueous solution/the palladium-containing solution; volume ratio) was 2.25.

Subsequently, under a nitrogen atmosphere, the autoclave was pressurized to 10 atm. While stirring the mixed solution at 1000 rpm, a mixed gas ($H_2$=10% by volume, $O_2$=18% by volume, and $N_2$=72% by volume) was distributed at 20° C. at a flow rate of 250 cc/min.

After the reaction had been performed for 2 hours, the pressure was reduced. Thereafter, the concentration of hydrogen peroxide in the water layer and the amount of hydrogen contained in discharged gas from the reaction system were measured. From these measurement results, the speed of generating hydrogen peroxide, hydrogen conversion rate, and selectivity were calculated. The results are shown in Table 1.

Examples 8 to 10 and Comparative Example 2

Hydrogen peroxide was produced in the same manner as that of Example 7, with the exception that the palladium-containing solutions B to D obtained in Examples 2 to 4 and the palladium-containing solution I obtained in Comparative Example 1 were each used, instead of the palladium-containing solution A. Thereafter, various measurements and calculations were carried out. The results are shown in Table 1.

Example 11

100 mL of the palladium-containing solution E obtained in Example 5 and 170 mL of an aqueous solution comprising 10 mmol/L NaBr (sodium bromide) was loaded into an autoclave equipped with a stirrer and a gas blowing pipe, so as to obtain a mixed solution. At this time, the ratio between the water layer and the organic layer (the aqueous solution/the palladium-containing solution; volume ratio) was 1.70.

Subsequently, under a nitrogen atmosphere, the autoclave was pressurized to 10 atm. While stirring the mixed solution at 1000 rpm, a mixed gas ($H_2$=10% by volume, $O_2$=18% by volume, and $N_2$=72% by volume) was distributed at 20° C. at a flow rate of 250 cc/min.

After the reaction had been performed for 2 hours, the pressure was reduced. Thereafter, the concentration of hydrogen peroxide in the water layer and the amount of hydrogen contained in discharged gas from the reaction system were measured. From these measurement results, the speed of generating hydrogen peroxide, hydrogen conversion rate, and selectivity were calculated. The results are shown in Table 1.

Example 12

45 mL of the palladium-containing solution E obtained in Example 5 and 225 mL of an aqueous solution comprising 10 mmol/L NaBr (sodium bromide) was loaded into an autoclave equipped with a stirrer and a gas blowing pipe, so as to obtain a mixed solution. At this time, the ratio between the water layer and the organic layer (the aqueous solution/the palladium-containing solution; volume ratio) was 5.00.

Subsequently, under a nitrogen atmosphere, the autoclave was pressurized to 10 atm. While stirring the mixed solution at 1000 rpm, a mixed gas ($H_2$=10% by volume, $O_2$=18% by volume, and $N_2$=72% by volume) was distributed at 20° C. at a flow rate of 250 cc/min.

After the reaction had been performed for 2 hours, the pressure was reduced. Thereafter, the concentration of hydrogen peroxide in the water layer and the amount of hydrogen contained in discharged gas from the reaction system were measured. From these measurement results, the speed of generating hydrogen peroxide, hydrogen conversion rate, and selectivity were calculated. The results are shown in Table 1.

Example 13

Hydrogen peroxide was produced in the same manner as that of Example 11, with the exception that the palladium-containing solution G obtained in Examples 6 was used instead of the palladium-containing solution E. Thereafter, various measurements and calculations were carried out. The results are shown in Table 1.

Example 14

To a two-necked eggplant shaped flask, 786 mg of palladium acetate (3.5 mmol; molecular weight of palladium acetate: 224.51) and 2.02 g of diphenyl sulfoxide (10 mmol; molecular weight of diphenyl sulfoxide: 202.79) were added. Further, 4.0 mL of chloroform was added thereto, and the obtained mixture was then stirred at 50° C. for dissolution. Subsequently, 3.2 mL of oleic acid was added to the reaction mixture, and the obtained mixture was then stirred at 50° C. for 1 hour while heating to obtain a black solution. Thereafter, heating was terminated, and the obtained solution was then cooled to room temperature. Hence, a palladium-containing composition was obtained. To the obtained palladium-containing composition, toluene was added to result in a total amount of 100 mL, thereby obtaining a palladium-containing solution J comprising diphenyl sulfoxide/palladium nanocolloidal particles. The content of palladium in the palladium-containing solution J, which was calculated from the amount of the palladium acetate added and the amount of the solution (the aforementioned "total amount"), was 35.0 mmol/L.

Example 15

A palladium-containing solution K comprising diphenyl sulfone/palladium nanocolloidal particles was obtained in the same manner as that of Example 14, with the exception that 2.18 g of diphenyl sulfone (10 mmol; molecular weight of diphenyl sulfone: 218.27) was used instead of 2.02 g of diphenyl sulfoxide. The content of palladium in the palladium-containing solution K, which was calculated from the amount of the palladium acetate added and the amount of the solution, was 35.0 mmol/L.

Example 16

100 mL of the palladium-containing solution J obtained in Example 14 and 170 mL of an aqueous solution (the pH of which was adjusted to pH 1 by addition of sulfuric acid), in which NaBr (10 mmol/L) had been dissolved, was loaded into an autoclave equipped with a stirrer and a gas blowing pipe, so as to obtain a mixed solution. At this time, the ratio between the water layer and the organic layer (the aqueous solution/the palladium-containing solution; volume ratio) was 1.70.

Subsequently, under a nitrogen atmosphere, the autoclave was pressurized to 10 atm. While stirring the mixed solution at 1000 rpm, a mixed gas ($H_2$=10% by volume, $O_2$=18% by volume, and $N_2$=72% by volume) was distributed at 20° C. at a flow rate of 250 cc/min.

After the reaction had been performed for 2 hours, the pressure was reduced. Thereafter, the concentration of hydrogen peroxide in the water layer and the amount of hydrogen contained in discharged gas from the reaction system were measured. From these measurement results, the speed of generating hydrogen peroxide, hydrogen conversion rate, and selectivity were calculated. The results are shown in Table 1.

Example 17

Hydrogen peroxide was produced in the same manner as that of Example 16, with the exception that the palladium-containing solution K obtained in Example 15 was used instead of the palladium-containing solution J. Thereafter, various measurements and calculations were carried out. The results are shown in Table 1.

Example 18

Hydrogen peroxide was produced in the same manner as that of Example 16, with the exceptions that the palladium-containing solution K obtained in Example 15 was used instead of the palladium-containing solution J, and that 170 mL of an aqueous solution (the pH of which was adjusted to pH 2 by addition of sulfuric acid), in which NaBr (10 mmol/L) had been dissolved, was used. Thereafter, various measurements and calculations were carried out. The results are shown in Table 1.

Example 19

Hydrogen peroxide was produced in the same manner as that of Example 16, with the exceptions that the palladium-containing solution K obtained in Example 15 was used instead of the palladium-containing solution J, and that 170 mL of an aqueous solution (the pH of which was adjusted to pH 3 by addition of sulfuric acid), in which NaBr (10 mmol/L) had been dissolved, was used. Thereafter, various measurements and calculations were carried out. The results are shown in Table 1.

Example 20

To a two-necked eggplant shaped flask, 786 mg (3.5 mmol) of palladium acetate, 49 mg of bis(acetylacetonato) platinum (II) (purity: 97% by mass, 0.12 mmol, $C_{10}H_4O_4Pt$), and 2.18 g (10 mmol) of diphenyl sulfone were added. Besides, palladium:platinum (moles)=96.8:3.2. Further, 4.0 mL of chloroform was added thereto, and the obtained mixture was then stirred at 50° C. for dissolution. Subsequently, 3.2 mL of oleic acid was added to the reaction mixture, and the obtained mixture was then stirred at 50° C. for 1 hour while heating to obtain a black solution. Thereafter, heating was terminated, and the obtained solution was then cooled to room temperature. Hence, a palladium-platinum containing composition was obtained. To the obtained palladium-platinum containing composition, toluene was added to result in a total amount of 100 mL, thereby obtaining a palladium-platinum containing solution L comprising diphenyl sulfoxide/palladium nanocolloidal particles. The content of palladium in the palladium-containing solution L, which was calculated from the amount of the palladium acetate added and the amount of the solution (the aforementioned "total amount"), was 35.0 mmol/L.

Example 21

Hydrogen peroxide was produced in the same manner as that of Example 16, with the exception that the palladium-platinum containing solution L obtained in Examples 20 was used instead of the palladium-containing solution J. Thereafter, various measurements and calculations were carried out. The results are shown in Table 1.

Example 22

Hydrogen peroxide was produced in the same manner as that of Example 16, with the exceptions that the palladium-containing solution K obtained in Example 15 was used instead of the palladium-containing solution J, and that 170 mL of an aqueous solution (the pH of which was not adjusted), in which NaBr (10 mmol/L) had been dissolved, was used. Thereafter, various measurements and calculations were carried out. The results are shown in Table 1.

TABLE 1

| | | Palladium-containing solution | | | | Reaction conditions for production of hydrogen peroxide | | | | | | | | |
|---|---|---|---|---|---|---|---|---|---|---|---|---|---|---|
| | | Pd con-centration [mmol/L] | Platinum con-centration [mmol/L] | Coating agent | | Amount of palladium-containing solution used [ml] | Aqueous solution | | | | Aqueous solution/ palladium-containing solution | Speed of generating hydrogen peroxide [mmol/h] | Hydrogen conversion rate [%] | Selectivity [%] |
| | | | | Name of substance | Structure | | Amount used [ml] | Phosphoric acid [mmol/L] | NaBr [mmol/L] | pH adjustment | pH | | | |
| Comp. Ex. 2 | I | 11.1 | 0.00 | Oleylamine | H₂N–(chain) | 40 | 90 | 0.5 | 2 | No | — | 2.25 | 0.15 | 23 | 1.1 |
| Ex. 10 | D | | 0.00 | trans,trans-1,5-Diphenyl-1,4-pentadien-3-one | (structure) | | | | | | | | 0.41 | 19 | 3.6 |
| Ex. 8 | B | | 0.00 | Trioctylphosphine oxide | n-C₈H₁₇–P(=O)(n-C₈H₁₇)–n-C₈H₁₇ | | | | | | | | 0.21 | 10 | 3.5 |
| Ex. 9 | C | | 0.00 | Methyl(diphenyl) phosphine oxide | (structure) | | | | | | | | 2.6 | 85 | 4.9 |
| Ex. 7 | A | | 0.00 | Triphenylphosphine oxide | (structure) | | | | | | | | 3.6 | 92 | 6.3 |
| Ex. 13 | G | 10.0 | 0.00 | Diphenyl sulfoxide | (structure) | 100 | 170 | 0 | 10 | No | — | 1.70 | 6.9 | 56 | 19 |

TABLE 1-continued

| | Palladium-containing solution | | | | | Reaction conditions for production of hydrogen peroxide | | | | | | | | |
|---|---|---|---|---|---|---|---|---|---|---|---|---|---|---|
| | | Pd con-centration [mmol/L] | Platinum con-centration [mmol/L] | Coating agent | | Amount of palladium-containing solution used [ml] | Aqueous solution | | | | | Aqueous solution/ palladium-containing solution | Speed of generating hydrogen peroxide [mmol/h] | Hydrogen conversion rate [%] | Selectivity [%] |
| | | | | Name of substance | Structure | | Amount used [ml] | Phosphoric acid [mmol/L] | NaBr [mmol/L] | pH adjustment | pH | | | | |
| Ex. 11 | E | | 0.00 | Triphenylphosphine oxide | [structure] | 100 | 170 | 0 | 10 | No | — | 1.70 | 6.8 | 88 | 14 |
| Ex. 12 | | 35.0 | 0.00 | | | 45 | 225 | 0 | 10 | No | — | 5.00 | 4.6 | 73 | 10 |
| Ex. 16 | J | | 0.00 | Diphenyl sulfoxide | [structure] | 100 | 170 | 0 | 10 | Yes | 1 | 1.70 | 13.8 | 85 | 53 |
| Ex. 17 | K | | 0.00 | Diphenyl sulfone | [structure] | 100 | 170 | 0 | 10 | Yes | 1 | 1.70 | 18.2 | 86 | 63 |
| Ex. 18 | K | | 0.00 | | | | | | | Yes | 2 | | 15.0 | 86 | 60 |
| Ex. 19 | K | | 0.00 | | | | | | | Yes | 3 | | 14.0 | 85 | 55 |
| Ex. 21 | L | | 1.12 | | | | | | | Yes | 1 | | 18.7 | 87 | 66 |
| Ex. 22 | K | | 0.00 | | | | | | | No | — | | 10.9 | 74 | 18 |

The invention claimed is:

1. A method of producing hydrogen peroxide, comprising:
   producing a palladium-containing composition that comprises palladium particles and a coating agent that coats a surface of the palladium particles; and
   reacting hydrogen with oxygen in a presence of the palladium-containing composition such that hydrogen peroxide is obtained,
   wherein the coating agent comprises at least one compound selected from the group consisting of trans,trans-1,5-diphenyl-1,4-pentadien-3-one, and diphenyl sulfone.

2. The method of claim 1, further comprising:
   preparing a palladium-containing solution by mixing the palladium-containing composition with an organic solvent;
   preparing a mixed solution by mixing the palladium-containing solution with water or an aqueous solution; and
   supplying hydrogen and oxygen into the mixed solution such that hydrogen peroxide is generated.

3. The method of claim 2, wherein the organic solvent is selected from the group consisting of toluene, butylbenzene, pseudocumene (1,2,4-trimethylbenzene), 1,3,4-trimethylbenzene, 1,2,5-trimethylbenzene, mesitylene (1,3,5-trimethylbenzene), tert-butylbenzene, and tert-butyltoluene, and
   the preparing of the mixed solution comprises mixing the palladium-containing solution with a sodium bromide aqueous solution.

4. The method of claim 3, wherein the organic solvent is toluene.

5. The method of claim 2, wherein, in a reaction solution after the generation of hydrogen peroxide, the palladium particles are present in an organic layer and the hydrogen peroxide is present in a water layer.

6. The method of claim 2, wherein the water or aqueous solution is an acid aqueous solution having a pH value of 0.5 to 2.0.

7. The method of claim 1, wherein the reacting comprises no catalyst other than the palladium-containing composition.

8. The method of claim 1, wherein the palladium particles are palladium colloidal particles having a specific mean particle diameter of 1 to 10 nm.

9. The method of claim 1, wherein the palladium particles are palladium colloidal particles, and
   the palladium-containing composition comprises the palladium colloidal particles uniformly dispersed in an organic solvent.

10. The method of claim 1, wherein the palladium particles are palladium colloidal particles having a specific mean particle diameter of 1 to 10 nm, and
    the palladium-containing composition comprises the palladium colloidal particles uniformly dispersed in an organic solvent.

11. The method of claim 1, further comprising:
    preparing a palladium-containing solution by mixing the palladium-containing composition with an organic solvent;
    preparing a mixed solution by mixing the palladium-containing solution with water or an aqueous solution before adding hydrogen and oxygen; and
    supplying hydrogen and oxygen into the mixed solution such that hydrogen peroxide is generated.

12. The method of claim 11, wherein the mixed solution comprises palladium colloidal particles having a specific mean particle diameter of 1 to 10 nm and uniformly dispersed in the organic solvent.

13. The method of claim 1, wherein the producing the palladium-containing composition comprises mixing the palladium particles with the coating agent to form a mixture and stirring the mixture in a presence of an organic solvent.

* * * * *